(12) United States Patent
Hoffmann et al.

(10) Patent No.: US 8,826,670 B2
(45) Date of Patent: Sep. 9, 2014

(54) METHOD FOR CONTROLLING A GAS TURBINE IN A POWER STATION, AND A POWER STATION FOR CARRYING OUT THE METHOD

(75) Inventors: Jürgen Hoffmann, Untersiggenthal (CH); Johann Josef Daxer, Untersiggenthal (CH); Bernhard Wippel, Wettingen (CH); Klaus-Dieter Liedtke, Endingen (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/875,705

(22) Filed: Sep. 3, 2010

(65) Prior Publication Data

US 2011/0037276 A1 Feb. 17, 2011

Related U.S. Application Data

(63) Continuation of application No. PCT/EP2009/051573, filed on Feb. 11, 2009.

(30) Foreign Application Priority Data

Mar. 5, 2008 (CH) ........................................ 0321/08

(51) Int. Cl.
*F02C 9/00* (2006.01)
*F02C 9/20* (2006.01)
*F02C 9/28* (2006.01)
*F02C 9/54* (2006.01)
*F02C 9/22* (2006.01)

(52) U.S. Cl.
CPC . *F02C 9/22* (2013.01); *Y02E 20/16* (2013.01); *F02C 9/28* (2013.01); *Y02E 20/14* (2013.01); *F02C 9/54* (2013.01); *F05D 2270/44* (2013.01); *F05D 2270/11* (2013.01)
USPC ........... 60/773; 60/39.24; 60/39.27; 415/146; 415/147; 415/148

(58) Field of Classification Search
USPC ............. 60/39.23, 39.27, 772, 773, 782, 784, 60/785, 806; 415/146, 147, 148
See application file for complete search history.

(56) References Cited

U.S. PATENT DOCUMENTS 4,081,956 A * 4/1978 Baker et al. ................. 60/39.182
4,173,119 A * 11/1979 Greune et al. ................. 60/791
5,313,782 A 5/1994 Frutschi et al.
5,634,327 A 6/1997 Kamber et al.

(Continued)

FOREIGN PATENT DOCUMENTS

DE 10308384 A1 9/2004
EP 0718470 A2 6/1996

(Continued)

*Primary Examiner* — Phutthiwat Wongman
*Assistant Examiner* — Steven Sutherland
(74) *Attorney, Agent, or Firm* — Buchanan Ingersoll & Rooney PC

(57) ABSTRACT

A method is provided for operating a gas turbine in a power station in which limits of the operating concept, which provide limits for optimization of the power station operation in respect of efficiency, service life consumption, emissions and power provision to the grid system, are adapted during operation. In particular, temperature limits and compressor inlet guide vane position limits are varied as a function of the optimization aims. A gas turbine power station is also provided for carrying out the method.

20 Claims, 3 Drawing Sheets

(56) References Cited

U.S. PATENT DOCUMENTS

| | | | |
|---|---|---|---|
| 6,112,513 A * | 9/2000 | Catt et al. ............... 60/204 |
| 6,164,057 A * | 12/2000 | Rowen et al. ............ 60/39.27 |
| 6,253,554 B1 * | 7/2001 | Kobayashi et al. ....... 60/736 |
| 6,364,602 B1 * | 4/2002 | Andrew et al. ........... 415/1 |
| 6,438,484 B1 | 8/2002 | Andrew et al. |
| 6,845,746 B2 * | 1/2005 | Hilger et al. ............. 123/298 |
| 6,945,030 B2 * | 9/2005 | Hirayama et al. ........ 60/39.27 |
| 7,104,071 B2 * | 9/2006 | Braun et al. .............. 60/775 |
| 7,117,662 B2 * | 10/2006 | Hirayama et al. ........ 60/39.27 |
| 7,152,409 B2 | 12/2006 | Yee et al. |
| 7,422,414 B2 | 9/2008 | Fujii et al. |
| 2006/0174630 A1 | 8/2006 | Hellat et al. |
| 2007/0227155 A1 | 10/2007 | Nemet et al. |

FOREIGN PATENT DOCUMENTS

| | | |
|---|---|---|
| EP | 1256726 A1 | 11/2002 |
| EP | 1840354 A1 | 10/2007 |
| JP | 5179904 A2 | 7/1993 |
| JP | 2001200730 A2 | 7/2001 |
| JP | 2006515659 T2 | 6/2006 |
| JP | 2007040171 A2 | 2/2007 |

* cited by examiner

US 8,826,670 B2

METHOD FOR CONTROLLING A GAS TURBINE IN A POWER STATION, AND A POWER STATION FOR CARRYING OUT THE METHOD

CROSS REFERENCE TO RELATED APPLICATION

This application is a continuation of International Application No. PCT/EP2009/051573 filed Feb. 11, 2009, which claims priority to Swiss Patent Application No. 00321/08, filed Mar. 5, 2008, the entire contents of all of which are incorporated by reference as if fully set forth.

FIELD OF INVENTION

The present invention relates to the field of power station technology, and to a method for optimized operation of a gas turbine in a power station, in respect of power, efficiency, emissions and/or service life consumption.

BACKGROUND

A method for controlling a gas turbine, which allows the operator to operate a gas turbine power station safely, is normally referred to as an operating concept. The disclosure relates to the optimization of load operation, that is to say that part of an operating concept which controls the operation when the gas turbine is connected to an electrical grid system, and is delivering power to it. The operating concept defines how various parameters of the gas turbine must be controlled for safe operation of the gas turbine. The operating concept is implemented by the controller. By way of example, the gas turbine power can be adjusted by varying the at least one turbine inlet temperature, the compressor inlet mass flow, or both parameters. By way of example, the compressor inlet mass flow can be adjusted by varying the inlet geometry of the compressor by means of a variable inlet guide grid.

The turbine inlet temperature level essentially governs service life consumption and the length of the inspection interval of the gas turbine. Furthermore, it essentially governs the exhaust gas emissions from the gas turbine.

If the inlet mass flow is constant, the power of a gas turbine is governed essentially by the turbine inlet temperature level. The gas turbine outlet temperature is proportional to the turbine inlet temperature level, and is inversely proportional to the pressure ratio of the gas turbine.

The efficiency of a combined gas and steam turbine power station in a so-called combined-cycle power station is proportional to the gas turbine outlet temperature level and the gas turbine efficiency. In consequence, the overall efficiency and the power of a combined-cycle power station are proportional to the gas turbine inlet temperature.

In the theoretical Brayton cycle, with a constant turbine inlet temperature and constant component efficiencies, the efficiency of the gas turbine is proportional to the pressure ratio. In the actual machine, when the turbine inlet temperature is constant, the pressure ratio is proportional to the mass flow. However, in reality, the component efficiencies vary as a function of the mass flow and the temperature. In particular, the compressor efficiency is dependent on the mass flow, which is controlled by the inlet guide vane setting. Furthermore, for example, losses in inlets and outlets or diffusers are a function of the volume flow or mass flow. A corresponding situation applies to the boiler, to its pressure loss for the hot gases flowing through it, and to the water-steam circuit that is connected. Designing the components for a mass flow means that the efficiency of an actual gas turbine and of an actual gas turbine combined-cycle power station does not rise in proportion to the pressure or mass flow, but has a maximum. If the mass flow, and therefore the pressure ratio, are raised above this maximum, then the efficiency falls. In general, it is possible to increase the power of the power station above the maximum efficiency operating point.

In the upper load range, and when a load reduction takes place starting from full load (or base load), for example, modern gas turbines are controlled such that the turbine inlet temperature (or hot gas temperature), which is limited by a limiter, is first of all reduced. The limiter is correspondingly reduced from the full load value to the part load value. The inlet mass flow is then reduced by controlling the pitch angle of at least one variable row of inlet guide vanes VIGV in the compressor, which is itself limited by a limit. The fuel mass flow is reduced during reduction in the inlet mass flow, in order to control the turbine inlet temperature below the respectively applicable limit. As soon as the turbine outlet temperature TAT, which rises in inverse proportion to the falling pressure ratio as the mass flow decreases at a constant turbine inlet temperature TIT, has reached the relevant TAT limit value, the fuel mass flow is reduced in order to control the TAT below the limit. The TIT then falls below its limit. EP0718470 discloses an example of an operating concept for a modern gas turbine with sequential combustion.

In order to operate a gas turbine in accordance with the concept described in EP0718470, a TIT must be determined, or must be determined approximately. Various temperatures can be used as the turbine inlet temperature. It is possible to use a theoretical mixture temperature of the hot gases and of all the cooling air mass flows in accordance with ISO 2314/1989. However, for example, the control process can also be based on the hot gas temperature upstream of the inlet to the turbine, or the so-called "firing temperature", a mixing temperature after the first turbine inlet guide vane.

EP1840354 discloses one example for determining the TIT. Further, usually simpler but less precise approximations are known to the person skilled in the art.

Conventionally, electricity generating costs can be minimized, in the sense of flexible adaptation of the gas turbine inlet temperature and/or the position of the compressor inlet grid only on starting operation again, when the appropriate limits for part load and full load to achieve specific maximum or minimum load values are defined. For example, it will be necessary to start up the gas turbine again if, in the event of an increase in the fuel price, one wished to achieve the efficiency by accepting a reduced service life and therefore a shorter servicing interval by increasing the temperature limits.

SUMMARY

The present invention is directed to a method for controlling a gas turbine in a power station, including at least one compressor with at least one variable row of inlet guide vanes, at least one combustion chamber and at least one turbine. The method includes varying at least one limit of an operating concept by a power station operator during operation; and matching optimization aims of the power station in respect of power, efficiency, emissions and/or service life consumption.

In a further embodiment, the invention is directed to a power plant for carrying out the above method. The power station includes at least one gas turbine comprising at least one compressor with at least one variable row of inlet guide vanes, at least one combustion chamber; at least one turbine and a control system. The power station is designed for operation within the various adjustable limits and has a person-machine interface for selection of an optimization aim

BRIEF DESCRIPTION OF THE DRAWINGS

Further advantages, features and details of the invention will become evident from the following analysis of preferred exemplary embodiments and from the drawings in which, schematically.

DETAILED DESCRIPTION OF THE PREFERRED EMBODIMENTS

Introduction to the Embodiments

Figure 1:
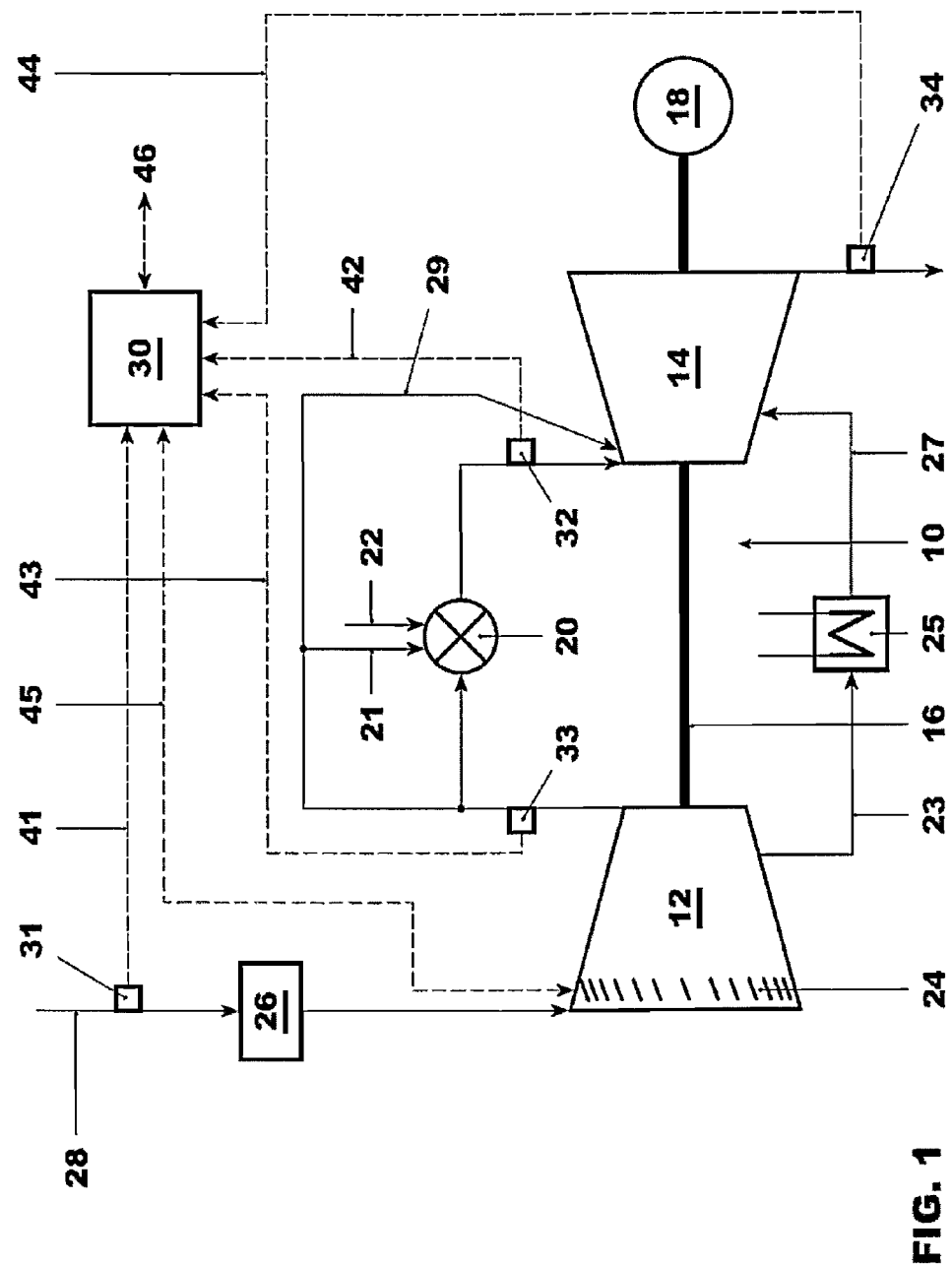
FIG. 1 shows a simplified block diagram of a power station with a gas turbine.

An object of the invention is to provide a method, referred to as an operating concept, for controlling a power station based on a gas turbine, which method allows flexible matching of the method to changing optimization aims, without recommissioning.

The object is achieved according to the invention in that various limits, which govern the operating concept of a gas turbine such as limits of the turbine inlet temperature and/or of the angle of at least one row of compressor inlet guide vanes, can be matched to the requirements by the power station operator during operation.

Conventionally, the main control parameters, such as the turbine inlet temperature TIT, the turbine outlet temperature TAT and the angle of at least one row of compressor inlet guide vanes VIGV, are controlled within fixed limits. For protection against excessively high temperatures or volume flows, which, if exceeded, would quickly lead to serious damage to the power station, these parameters are protected by multiple-redundant measurements. In this case, protective actions such as rapid shut down or tripping of the gas turbine are implemented in the control system, with a defined safety margin from the limits of the control systems.

When matching protection-relevant limits, such as the TIT, TAT or the VIGV, it is necessary to ensure that the threshold values at which the protective actions are initiated are appropriately matched to the changes in the limits as well, or are defined such that they ensure reliable protection within the scope of the possible variations of the limit values.

The method according to the invention provides the power station operator with the capability to minimize the electricity generating costs at any time in accordance with the requirements.

The electricity generating costs depend substantially on the costs and income related to operation of a power station. The costs are primarily the fuel costs that have to be paid by the power station, whose level is governed by the net efficiency of the power station, costs for servicing and maintenance of the power station, labor costs, possibly emission tax, as well as capital costs, license costs and fees for operating licenses. The power station achieves income by selling the electrical power, in the case of so-called "co-generation", by process steam and heat, and for the provision of power margins to the grid system.

The flexible gas turbine operating concept according to the invention allows operation to be optimized in respect of minimizing the electricity generating costs. In this case, it is possible to vary during operation between various limits, which govern the operating concept of the power station, while generating a constant or changing power. In particular, the full load limits and part load limits for the at least one TIT, the full load and part load limits for the at least one TAT, and the limit for the VIGV position are varied. By way of example, the power station operator can vary the limits in this way by selecting different methods of operation on the control console of the power station or the gas turbine. For user-friendly control, the operator need not adapt individual limits but can select various methods of operation on the control console, with the controller then operating automatically with the appropriate set of limits. By way of example, this may be efficiency-optimized operation, operation for maximum power, operation with reduced NOx emissions, operation with reduced part load CO emissions, operation with lengthened servicing intervals, or a combination of optimization aims. Ways to implement these methods of operation will be indicated with reference to the following exemplary embodiments.

The power station operator can intervene by an input on a suitable person-machine interface, typically the so-called operator station, the control computer or the controller for the power station. It is likewise possible to make an input via a control console for a group of power stations, or for the grid system operator to do this. The optimization aims can also be defined and automatically adapted as a function of external conditions. For example, the optimization aims may be predetermined as a function of the time of year. By way of example, it may be advantageous to operate the power station on a power-optimized basis in the summer in order to compensate as far as possible for the typical reduction in the power output of gas turbines when the ambient temperatures are high, and to operate on an efficiency-optimized basis in the winter. The expression "an operator" in this case also means a driver, controller or manager, that is to say in this case those persons who are directly or indirectly controlling or monitoring the operation of the power station.

All of the explained advantages can be used not only in the respectively stated combinations but also in other combinations, in combination with the control of other parameters, or on their own, without departing from the scope of the invention.

In addition to the method, the subject matter of the invention covers a gas turbine for carrying out the method. The configuration of the gas turbine must be adapted to ensure the feasibility of the method, depending on the chosen method or combination of methods.

In the case of gas turbines, the cooling air pressure ratios vary as a function of the compressor inlet conditions and the operating state. They are also dependent on the VIGV position. The cooling air pressure ratios of cooling air taken from the compressor before the end of the compressor in this case typically fall when the VIGVs are closed. In order to ensure safe operation, the pressure ratios are set, for example, such that they ensure adequate cooling over the entire ambient operating range for full load operation with the associated TIT. In addition, for partial load, it is necessary to ensure that the cooling air pressure ratio, which decreases on part load when the VIGVs are closed, still ensures adequate cooling, as a function of the part load TIT.

In general, gas turbines are designed with cooling air pressure ratios corresponding to the standard operating concept. Furthermore, for example, a pressure margin is provided in the design, in order to make it possible to compensate for manufacturing tolerances and other uncertainties. The correct pressure ratio is then set, for example by means of orifices, during commissioning.

In the case of conventional gas turbines, this configuration and setting are carried out for a standard operating concept. The gas turbine according to the invention is distinguished in that it is designed for at least the limit variations which are planned in the respective power station, and for the operating concepts which result from this. In addition, the pressure ratios are set, upon activation, corresponding to the planned variations in the limits and the operating concepts which result from them, for example by means of orifices.

According to one further refinement, the power station systems are designed such that they allow a lengthened servicing interval, corresponding to the operating concept.

In order to allow the selection of power-optimized limits, the electrical systems, that is to say the generators and transformers as well, must be designed such that the maximum power station power, which can be achieved within the specific limits, can be delivered to the grid. The fuel system must also be correspondingly designed for the maximum possible fuel mass flow.

Furthermore, the various sets of limit values corresponding to the intended operating concepts are stored in the controller and/or the associated memory unit, thus making it possible to switch between the limits.

In a combined-cycle power station, the water-steam circuit including the boiler must also be designed for all possible variations of the TAT and the exhaust gas mass flow, which result from the various combination of limits provided for the power station in the gas turbine operating concept.

DETAILED DESCRIPTION

A gas turbine 10, which comprises a compressor 12, a combustion chamber 20 and a turbine 14 and is a central component, can be seen in a power station illustrated in FIG. 1. The compressor 12 and the turbine 14 are arranged on a common shaft 16, which drives a generator 18. The compressor 12 inducts air from the surrounding area via an air inlet 28 and a filter 26, compresses it and passes the compressed air via a plenum to the combustion chamber 20. The air mass flow can be controlled via at least one variable row of inlet guide vanes 24. A portion of the compressed air is tapped off at the end of the compressor as cooling air in order to cool service life critical hot gas parts. This high-pressure cooling air is used as combustion chamber cooling air 21 and as high-pressure turbine cooling air 29. Depending on the design, it can be recooled to a cooling air temperature by a cooling air cooler (not illustrated). A second portion of the compressed air is tapped off in the compressor as cooling air 23 for cooling service life critical hot gas parts. In order to ensure better cooling, the cooling air can be cooled via a cooling air cooler 25 to a cooling air temperature $T_{cool}$, and can be used as recooled cooling air 27 for cooling service life critical hot gas parts. The remaining air mass flow is used in the combustion chamber for combustion of a fuel (liquid or gaseous), which is supplied via a fuel supply 22. The resultant hot gas is expanded in the turbine 14, producing work, and can then be used, for example, in a downstream waste-heat steam generator to produce process steam or steam for a steam turbine. The measurement of the cooling air temperature $T_{cool}$, and the control of the cooling air cooler 25, which can be integrated in the gas turbine controller 30, are not illustrated.

A controller 30 is provided to control the gas turbine, and is illustrated as a simple block with a small number of signal lines in the figure. In reality, however, it may be highly complex and may have a large number of inputs/outputs for the various installation parts. The signal line 46 connects the gas turbine controller 30 to the controller unit, which controls the power station unit including the gas turbine, boiler and water-steam circuit.

Various sets of limit values, which limit the VIGV, TIT, TAT and the cooling air temperature $T_{cool}$ for part load and full load, are stored in a data memory which is associated with the controller 30 or is integrated in the controller 30.

Fundamental process variables are used to control the gas turbine 10, to be precise in particular the pitch angle VIGV of the at least one variable row of inlet guide vanes 24 in the compressor 12 and the turbine inlet temperature TIT at the inlet to the turbine 14. A data line 45 is provided between the at least one variable row of inlet guide vanes 24 and an input to the controller 30, in order to control the VIGVs. Not only is the nominal position of the inlet guide vanes sent via this line 45 to the VIGV control mechanism, but the measured actual position of the VIGV is also transmitted to the controller. Ideally, the turbine inlet temperature TIT can be measured at the turbine inlet, and can be transmitted via a data line 42 to the controller. In practice, this is not possible in modern gas turbines because of the high TIT, as a result of which the TIT is approximated by means of the pressure ratio of the turbine 14 and the TAT. The TAT is measured via a sensor 34, and is transmitted to the controller via the data line 44. The pressure before and after the turbine 14 can be measured in order to determine the turbine pressure ratio. In practice, for simplicity, the measurement of the inlet pressure 31 and of the compressor outlet pressure 33, is often approximated for determining the pressure ratio, with their measured values being transmitted via the data lines 41 and 43 to the controller 30. The determination of the TIT from the stated measurement variables as well as corrections to take account of further parameters, such as the relative air humidity and the VIGV position, are known to a person skilled in the art.

Figure 2:
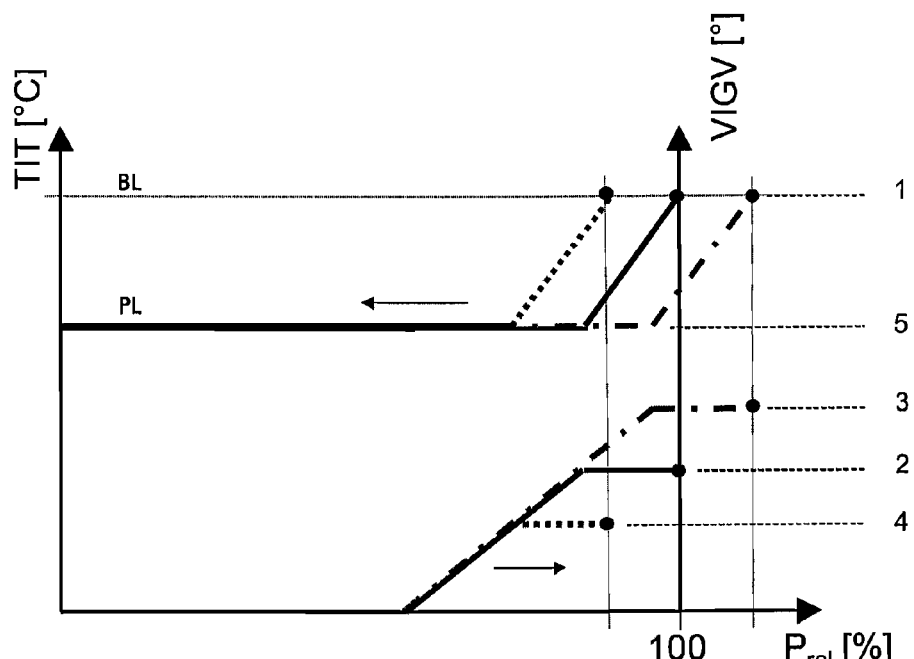
FIG. 2 shows the various VIGV full load limits of a gas turbine and the associated profile of the turbine inlet temperature plotted against the load in the upper load range.

FIG. 2 shows various VIGV full load limits of a gas turbine as well as the TIT full load limit 1 and the TIT part load limit 5, and the associated profile of the turbine inlet temperature TIT and of the VIGV plotted against the relative load $P_{rel}$ in the upper load range. These are represented schematically by solid lines for standard design operation, by dotted lines for efficiency-optimized operation and by dashed-dotted lines for power-optimized operation.

The influence of the limits on the operating concept will be explained for a load reduction starting from full load. For standard design operation (solid line), in which the VIGVs are at the VIGV full load limit for standard design operation 2 and the TITs are at the full load limit for standard design operation 1, the TIT is first of all reduced in a manner controlled via the fuel mass flow until the TIT part load limit for standard design operation 5 is reached at a high partial load. The VIGVs remain constantly open during this load reduction at the VIGV full load limit for standard design operation 2. As soon as the TIT part load limit for standard design operation 5 is reached, the TIT is kept constant, and the load is controlled via the VIGV position. The TIT is in this case kept constant at the TIT part load limit for standard design operation 5 by means of the fuel mass flow.

If the VIGV full load limit is reduced in order to reduce the maximum mass flow to the limit for efficiency-optimized operation 4, the operating concept is shifted in the upper load range (dotted line). The full load is reached at the same TIT full load limit 1. Because of the reduced mass flow, the full load power is less. The TAT, which is not illustrated here, is increased because of the reduced mass flow. In the illustrated example, both the component efficiencies of the gas turbine and therefore the gas turbine efficiency as well as the efficiency of the downstream water-steam circuit are improved with the reduced mass flow and the increased exhaust gas temperature, thus improving the overall efficiency of the power station. This efficiency improvement cannot be achieved simply by load reduction with the standard design operating concept, since, following this, the TIT would first of all be reduced, starting from full load, which would result in an efficiency reduction.

If the VIGV full load limit is increased in order to increase the maximum mass flow to the limit for power-optimized operation 3, the operating concept is shifted in the upper load range (dashed-dotted line). Full load is reached at the same TIT full load limit 1. The full load power is higher because of the increased mass flow with the VIGVs being opened further.

Figure 3:
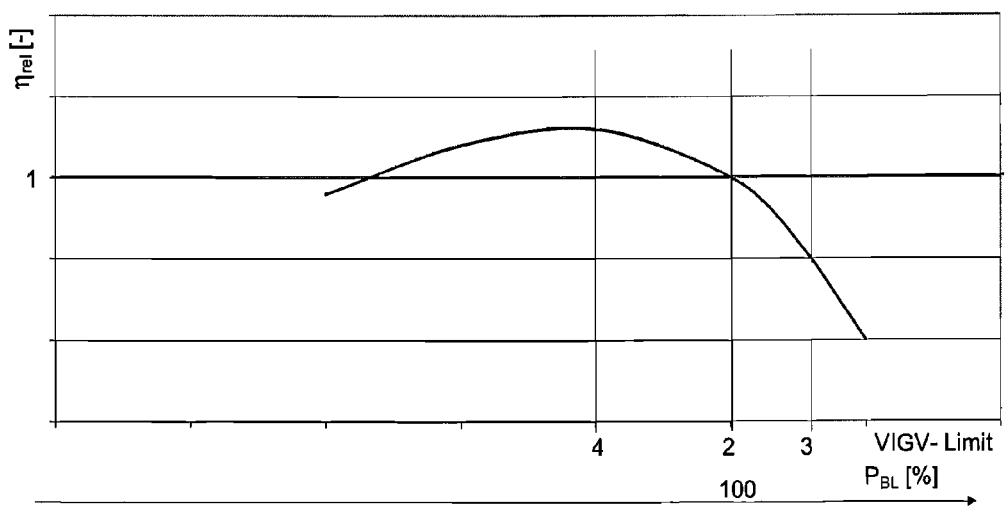
FIG. 3 shows the relative efficiency on full load $\eta_{rel}$ as a function of the normalized full load power $P_{BL}$ with respect to the full load efficiency in standard design conditions, with the power $P_{BL}$ being adjusted by varying the VIGV full load limits.

FIG. 3 shows the relative efficiency at full load $\eta_{rel}$ as a function of the normalized full load power $P_{BL}$ with respect to the full load efficiency in the standard design conditions. The full load power $P_{BL}$ is set by variation of the VIGV full load limit.

If, in the illustrated example, the VIGV full load limit is reduced from the standard design limit 2, then the efficiency first of all rises because, as explained with reference to FIG. 2, the efficiencies of the individual components first of all improve with a reduced mass flow. It is then possible to achieve a better efficiency than the standard design with the VIGV full load limit for efficiency-optimized operation 4.

If the VIGV full load limit is reduced further, the pressure ratio decreases with the mass flow, and therefore the efficiency of the theoretical process decreases. Furthermore, the main components are operated so far away from their design point that the component efficiencies no longer rise, but also fall again.

If, in the illustrated example, the VIGV full load limit is increased with respect to the standard design limit 2, the power can be increased by accepting a reduced efficiency. The greater the extent to which the VIGV full load limit is increased, the more steeply the efficiency falls, as a result of which the capability to increase the VIGV full load limit 3 is limited. In addition, the VIGVs cannot be opened indefinitely because of the compressor surge limit and the required safety margin from the surge limit, or limits of other components. The safety margin from the surge limit can be determined taking account of manufacturing tolerances, possible compressor dirt as well as the grid-system requirements relating to reduced-frequency operation.

The proposed variable VIGV full load limit allows the gas turbine to be operated in a region around the standard design limit 2 which is bounded by the safety margins from the compressor surge limit or limits of other components, and the efficiency optimum.

Figure 4:
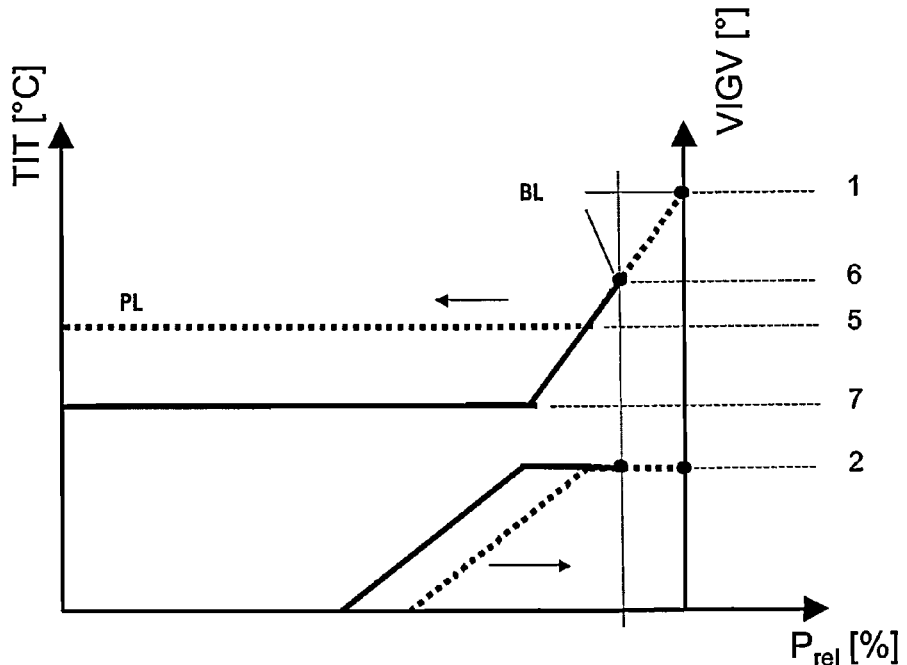
FIG. 4 shows the TIT full load and TIT part load limits of a gas turbine for the standard design and service life-optimized operating concept, and the associated profile of the VIGV setting and TIT plotted against the load in the upper load range.

FIG. 4 shows the limits and the profile of the TIT and VIGV (solid lines) for a service life-optimized operating concept in the upper load range. Furthermore, the limits of the standard design operating concept in the upper load range and the corresponding profile of the TIT and VIGVs are illustrated as a reference, plotted against the load, as a dotted line.

In order to achieve a service life-optimized operating concept without changing the VIGV full load limit 2, a reduced TIT full load limit 6 and a reduced TIT part load limit 7 are introduced. The reduced TIT results in a lower full load power for the same full load mass flow. The corner point at which the TIT part load limit 7 is reached starting from full load is likewise shifted to a lower load, corresponding to the reduced limits. The VIGVs correspondingly start to close at a lower load as well. In order to correspondingly increase service life at a low partial load, it may also be necessary to reduce the TAT limits.

The TIT and TAT limits cannot be reduced indefinitely in order to increase service life. If the limits are reduced to a major extent, the combustion can become unstable leading to extinguishing pulsations and/or increased emissions. In addition to those of the gas turbine, it is also necessary to take account of the limits of the connected water-steam circuit, including the boiler. If the resultant TAT deviates excessively from the design point, the efficiency of the water-steam circuit falls severely, as a result of which the operation ceases to be viable, despite the increased service life.

Analogously to the service life increase, a reduction in the NOx emissions can be achieved by reducing at least the TIT full load limit 1. Furthermore, a power increase can be achieved by increasing the limits, but with a reduced service life.

Figure 5:
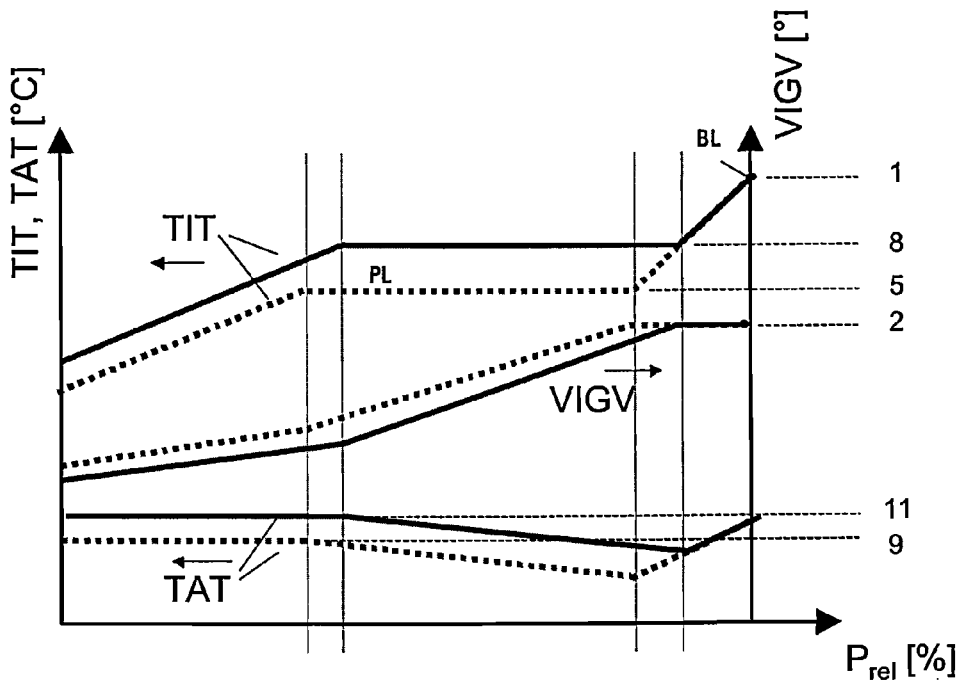
FIG. 5 shows the TIT and TAT part load limits for CO-emission-optimized operation in comparison with the limits in service life-optimized operation, as well as the associated profile of the VIGV setting and TIT plotted against the load in the upper load range.

FIG. 5 shows the limits and the profile of the TIT, TAT and VIGVs (solid lines) for a CO-optimized operating concept. The limits of the standard design operating concept and the corresponding profile of the TIT and VIGVs, plotted against the load, are also illustrated, as a reference, in the form of a dotted line.

Depending on the design of the combustion chamber and burner, in the case of premixing burners which are optimized for low NOx emissions at the full load temperature, increased CO emissions can occur during part load operation with a reduced TIT. This is in general not a problem with the standard design operating concept. For specific requirements, for example very low CO emissions in part load operation, it may, however, be advantageous to keep the part load TIT at a higher level than the standard. In the case of a high partial load, this is achieved by using a TIT part load limit that is higher than the standard for CO-optimized operation 8.

In the case of a load reduction starting from full load, the increased TIT part load limits for CO-optimized operation 8 are reached at a higher load than in the case of the standard operating concept. This leads to the inlet mass flow being reduced even at a higher load, by closing the VIGVs.

With a mass flow decreased by closing the VIGVs, the exhaust gas temperature TAT rises at a constant part load TIT. This is limited in the standard operating concept by the TAT part load limit 9. As soon as the TAT has reached the TAT part load limit for standard design operation 9, the TAT is controlled, rather than the TIT, via the fuel mass flow.

In the illustrated example, not only is the TIT part load limit raised, but the TAT part load limit is also raised from the standard TAT part load limit 9 to the TAT part load limit for CO-optimized operation 11. Without this increase, the same TIT will be used in the low part load range as with the standard operating concept, and the same emissions could correspondingly also be expected. Depending on the design and the requirements, it is worthwhile raising only one of the two limits TIT part load or TAT part load for a CO-optimized operating concept.

In the case of gas turbines with a cooling air cooler, the cooling air temperature $T_{cool}$ is limited, and the cooling power of the at least one cooling air cooler is controlled such that the limit of the cooling air temperature $T_{cool}$ is not exceeded. On the one hand a change in the cooling air temperature $T_{cool}$ can influence the service life of critical hot-gas parts while, on the other hand, this can influence the overall efficiency of the power station, depending on the integration of the cooler in the overall power station and the utilization of the heat extracted in the cooler. In this case, a power station is generally optimized such that a reduction in the cooling air temperature $T_{cool}$ below the standard design limit leads to an efficiency loss. However, if the efficiency loss is accepted, it is possible, for example, to reduce the lifetime penalty of an increased TIT. The limit of the cooling air temperature $T_{cool}$ is therefore a further parameter for making the operating concept flexible, and for optimizing it.

The limits for TIT, TAT, cooling air temperature $T_{cool}$ or other limits for the various operating concepts are not necessarily constant values. Depending on the requirements, they can be controlled as a function of the load, of the VIGVs, or of some other parameter. Furthermore, the operating concepts are not restricted to the described examples. They can be combined or extended in various ways. For example, a service life-optimized operating concept can be combined with a reduced TIT full load limit 6, and a reduced TIT part load limit 7, with the various VIGV limits for power-optimized operation 3 or efficiency-optimized operation 4.

The corner points in FIGS. 2, 4 and 5, at which the control system changes, for example, from VIGV control to TIT control, are not firmly linked to a relative load. They may be shifted depending on the ambient conditions, in particular the compressor inlet temperature and the pressure and the state of the gas turbine. For example, every power station is subject to ageing, which leads to a power reduction, as a result of which the corner points can be shifted in the direction of a lower load, with the constraints otherwise being identical.

In addition to a reduction in the TIT and/or TAT limits for service life extension, it is often also expedient to make it possible to increase the limits in order to allow a power increase, while accepting the consumption of service life.

In one embodiment of the invention, a plurality of sets of limits can be selected which are associated with different service life factors. By way of example, these make it possible for the operator to operate the power station with a standard service life, to operate it with a service life increased by 30%, 50% or 100%, or alternatively to operate it with a service life reduced by 30% or 50%.

In a further embodiment of the invention, the operator can preset the desired service life within a desired framework, and the TIT and/or TAT limits are adapted as a function of this intended service life.

Flexible operation allows operation optimized to the efficiency and service life, as well as providing a significant power margin. Depending on the electrical grid system to which the power station is feeding power, a power station is normally operated, for example, at only about 90% of its full load power. This means that, on partial load, it is typically operated at a lower efficiency than the design efficiency. The flexible adaptation of the operating concept according to the invention makes it possible not only to avoid the efficiency losses resulting from part load operation for a power station such as this, but also to achieve an efficiency improvement by means of the efficiency-optimized operating concept. The required power margin can ideally be demonstrated by adaptation of the TIT and VIGV limits.

Depending on the electrical grid system, a so-called "spinning reserve" may also be sold. The "spinning reserve" generally refers to the capacity which can be additionally delivered to the grid system within 10 minutes, and can be delivered continuously for at least 2 hours. In a grid system such as this the power station can be operated with an efficiency-optimized or service life-optimized operating concept, and the possible additional power which can be produced by adaptation of the limits can be sold as a "spinning reserve".

The invention is not restricted to the described operating concepts and their combinations. It can be transferred analogously to other operating concepts, for example to an operating concept for gas turbines with sequential combustion or to operating concepts without a part load reduction of the TIT, or to concepts which provide additional stepping of the various limits.

LIST OF REFERENCE SYMBOLS

1 TIT full load limit for standard design operation
2 VIGV full load limit for standard design operation
3 VIGV full load limit for power-optimized operation
4 VIGV full load limit for efficiency-optimized operation
5 TIT part load limit for standard design operation
6 TIT full load limits for service life-optimized operation
7 TIT part load limits for service life-optimized operation
8 TIT part load limits for CO-optimized operation
9 TAT part load limit for limits for standard design operation
10 Gas turbine
11 TAT part load limit for limits for CO-optimized operation
12 Compressor
14 Turbine
16 Shaft
18 Generator
20 Combustion chamber
21 Combustion chamber cooling air
22 Fuel supply
23 Cooling air
24 Variable row of inlet guide vanes
25 Cooling air cooler
26 Filter
27 Recooled cooling air
28 Air inlet
29 High-pressure turbine cooling air
30 Controller
31 Sensor (compressor inlet conditions: temperature, pressure and air humidity)
32 Sensor (turbine inlet temperature TIT)
33 Sensor (compressor outlet pressure)
34 Sensor (turbine outlet temperature TAT)
41 Signal line (compressor inlet conditions)
42 Signal line (turbine inlet temperature TIT)
43 Signal line (compressor outlet pressure)
44 Signal line (turbine outlet temperature TAT)
45 Signal line (VIGV nominal position and actual position)
46 Signal line/signal exchange with the controller unit
TIT Turbine inlet temperature
TAT Turbine outlet temperature
$T_{cool}$ Cooling air temperature
VIGV Pitch angle of the variable row of inlet guide vanes
$P_{rel}$ Relative load with respect to full load at standard
$P_{BL}$ Normalized full load power
$\eta_{rel}$ Relative efficiency at full load $\eta_{rel}$
BL Full load
PL Part load

What is claimed is:

1. A method for controlling a gas turbine in a power station while operating under normal continuous load operation, comprising at least one compressor with at least one variable row of inlet guide vanes, at least one combustion chamber and at least one turbine, wherein a turbine inlet temperature, a turbine outlet temperature and a pitch angle of at least one row of compressor inlet guide vanes, are controlled by a controller within a set of limits, the method comprising:

increasing and decreasing a protection relevant limit comprising one of the turbine inlet temperature, turbine outlet temperature, and a limit for the angle of at least one row of compressor inlet guide vanes relative to a standard design value within which the controller automatically operates the gas turbine during operation of the power station under normal continuous load operation, the increasing and decreasing of the protection relevant limit comprising:

manually selecting one of the following settings of operation for the controller as a first selection to control operation of the power station for a first time period:
a power optimized operation in which the limit for the angle of at least one row of compressor inlet guide vanes is increased relative to a standard design limit to increase power output of the power station,
an efficiency optimized operation in which the limit for the angle of at least one row of compressor inlet guide vanes is reduced relative to a standard design limit to increase efficiency of operation of the power station,
a life optimized operation in which the limit for the turbine inlet temperature full load and for the turbine inlet temperature part load are reduced relative to a standard design limit to increase the life of the power station,
a NOx-optimized operation in which the limit for the turbine inlet temperature full load is reduced relative to a standard design limit to reduce NOx emissions of the power station, and
a CO-optimized operation in which the limit for the turbine inlet temperature part load is increased relative to a standard design limit to reduce CO emissions of the power station;

after the first selection of settings of operation for the controller is selected, increasing or decreasing the at least one protection relevant limit by manually selecting one of the other settings that is not the setting of the first selection to select a new setting of operation for the controller as a second selection to control operation of the power station for a second time period.

2. The method as claimed in claim 1, wherein at least one full load limit of a pitch angle of the at least one variable row of inlet guide vanes of the compressor is varied.

3. The method as claimed in claim 2, wherein a full load limit of the pitch angle of the at least one variable row of inlet guide vanes of the compressor is varied between a maximum limit, which is defined by a surge limit reduced by a safety margin, and a minimum limit, at which a greatest full load efficiency is reached.

4. The method as claimed in claim 1, wherein at least one full load limit of the turbine inlet temperature and/or at least one part load limit of the turbine inlet temperature are/is varied.

5. The method as claimed in claim 1, wherein at least one part load limit of a turbine outlet temperature is varied.

6. The method as claimed in claim 1, wherein at least one full load limit of a turbine inlet temperature and/or a part load limit of the turbine inlet temperature and/or at least one part load limit of the turbine outlet temperature are/is reduced with respect to a standard design limit, in order to increase service life.

7. The method as claimed in claim 1, wherein at least one part load limit of a turbine inlet temperature and at least one part load limit of a turbine outlet temperature are increased with respect to a standard design limit, in order to reduce CO emissions.

8. The method as claimed in claim 1, further comprising varying at least one cooling air temperature limit of a cooling air mass flow, wherein the cooling air mass flow is tapped off from the at least one compressor to cool life critical hot gas parts of the gas turbine.

9. The method as claimed in claim 1, wherein at least one limit for providing power margins with respect to a grid system is varied.

10. The method of claim 1, wherein the increasing and decreasing of the at least one protection relevant limit also comprises:

after the second selection of settings of operation for the controller is selected, increasing or decreasing the at least one protection relevant limit by selecting one of the other settings that is not the setting of the second selection to select a new setting of operation for the controller as a third selection to control operation of the power station for a third time period.

11. The method of claim 10 wherein the second selection to control operation of the power station for the second time period and the third selection to control operation of the power station for a third time period are effected via input manually provided to a person machine interface of the controller, and the method comprising:

varying at least one cooling air temperature limit of a cooling air mass flow wherein the cooling air mass flow is tapped off from the at least one compressor to cool life critical hot gas parts of the gas turbine.

12. The method of claim 1 wherein the selecting of one of the other settings that is not the setting of the first selection to select a new setting of operation for the controller as the second selection to control operation of the power station for a second time period is effected by manually providing input to a person machine interface for communicating the selecting of one of the other settings to the controller and is selected in response to the load of the power plant reducing to a partial load to avoid efficiency losses resulting from the power station operating at the partial load.

13. The method of claim 1, wherein the efficiency optimized operation in which the limit for the angle of at least one row of compressor inlet guide vanes is reduced relative to the standard design limit is selected; and wherein the selection of the efficiency optimized operation also results in at least one of:
a part load limit of the turbine inlet temperature being increased with respect to the standard design limit in order to reduce CO emissions, and
at least one part load limit of a turbine outlet temperature being increased with respect to the standard design limit in order to reduce CO emissions.

14. A power station, comprising at least one compressor with at least one variable row of inlet guide vanes, at least one combustion chamber, at least one turbine, and a control system, wherein a protection relevant limit relative to a design value is changeable during operation for matching optimization aims of the power station with respect to at least one of power, efficiency, emissions and service life consumption, wherein a controller of the control system designed and configured to control a turbine inlet temperature, a turbine outlet temperature and a pitch angle of at least one row of compressor inlet guide vanes and has a person machine interface for selection of an optimization aim comprising increasing and decreasing a protection relevant limit relative to a standard design value within which the controller automatically operates the gas turbine for one of the turbine inlet temperature, the turbine outlet temperature, and the limit for the angle of at least one row of compressor inlet guide vanes, wherein one of the following settings is manually selectable for adjusting a setting by which the controller operates the turbine under a continuous load:
- a power optimized operation in which the limit for the angle of at least one row of compressor inlet guide vanes is increased relative to a standard design limit to increase power output affected by operation of the power station,
- an efficiency optimized operation in which the limit for the angle of at least one row of compressor inlet guide vanes is reduced relative to a standard design limit to increase efficiency of power station operations,
- a life optimized operation in which the limit for the turbine inlet temperature full load and for the turbine outlet temperature part load are reduced relative to a standard design limit to increase the life of the power station,
- a NOx-optimized operation in which the limit for the turbine inlet temperature full load is reduced relative to a standard design limit to reduce NOx emissions of the power station, and
- a CO-optimized operation in which the limit for the turbine inlet temperature part load is increased relative to a standard design limit to reduce CO emissions of the power station; and
- wherein after one of the settings is firstly chosen for operation of the controller, another one of the settings is manually selectable at a second time to replace the firstly chosen one of the settings so the controller subsequently controls the turbine via the subsequently chosen one of the settings; and
- wherein the other one of the settings chosen at the second time is replaceable with one of the other settings at a third time.

15. The power station as claimed in claim 14, wherein a minimum cooling air feed pressure ratio, which is dependent on the turbine inlet temperature, is ensured for an entire operating range of pitch angles of the at least one variable row of inlet guide vanes in the compressor, wherein a cooling air mass flow is tapped off from the at least one compressor before the end of the at least one compressor for sending to the gas turbine such that a temperature limit of the cooling air mass flow is changeable to different settings, the cooling air mass flow being sent to the gas turbine to cool life-critical hot gas parts of the gas turbine.

16. The power station as claimed in claim 14, further comprising at least one boiler that follows the at least one gas turbine, and the at least one boiler is designed for all exhaust gas mass flows and exhaust gas temperatures which can occur as a result of the variation of operating limits.

17. The power station as claimed in claim 16, wherein at least one steam turbine is designed to convert to energy a maximum steam mass flow which is produced by the at least one boiler when the operating limits of the gas turbine are varied.

18. The power station as claimed in claim 14, wherein electrical systems are designed for a maximum power produced when operating limits of the gas turbine are varied.

19. The power station as claimed in claim 14, wherein fuel systems are designed for a maximum fuel mass flow required when operating limits of the gas turbine are varied.

20. The power station as claimed in claim 14, wherein selectability of another one of the settings to replace the firstly chosen one of the settings at the second time so the controller subsequently controls the turbine via the subsequently chosen one of the settings is effected via manually entered input provided to the person machine interface by a person responsible for operation of the gas turbine.

* * * * *